US008588477B2

(12) United States Patent
Holl et al.

(10) Patent No.: US 8,588,477 B2
(45) Date of Patent: Nov. 19, 2013

(54) METHOD FOR IDENTIFYING SOILING AND/OR COLOUR FADING IN THE REGION OF COLOUR TRANSITIONS ON DOCUMENTS OF VALUE, AND MEANS FOR CARRYING OUT THE METHOD

(75) Inventors: Norbert Holl, Germering (DE); Shanchuan Su, Neubiberg (DE)

(73) Assignee: Giesecke & Devrient GmbH, Munich (DE)

( * ) Notice: Subject to any disclaimer, the term of this patent is extended or adjusted under 35 U.S.C. 154(b) by 722 days.

(21) Appl. No.: 12/515,216

(22) PCT Filed: Nov. 15, 2007

(86) PCT No.: PCT/EP2007/009893

§ 371 (c)(1), (2), (4) Date: May 15, 2009

(87) PCT Pub. No.: WO2008/058742

PCT Pub. Date: May 22, 2008

(65) Prior Publication Data

US 2009/0245590 A1 Oct. 1, 2009

(30) Foreign Application Priority Data

Nov. 15, 2006 (DE) ........................ 10 2006 053 788

(51) Int. Cl.
*G06K 9/00* (2006.01)

(52) U.S. Cl.
USPC ........... 382/112; 382/135; 382/162; 382/165; 382/190; 283/72; 250/556; 356/71; 356/72; 902/7

(58) Field of Classification Search
USPC ............ 382/112, 135, 162, 165, 190; 283/72; 250/556; 356/71, 72; 902/7
See application file for complete search history.

(56) References Cited

U.S. PATENT DOCUMENTS

| | | | | |
|---|---|---|---|---|
| 3,942,154 | A | 3/1976 | Akami et al. | |
| 4,587,434 | A * | 5/1986 | Roes et al. | 250/556 |

(Continued)

FOREIGN PATENT DOCUMENTS

| | | |
|---|---|---|
| CA | 02266290 | 9/1999 |
| DE | 24 31 500 | 2/1975 |

(Continued)

OTHER PUBLICATIONS

Search Report of German Patent and Trademark Office regarding German Patent Application No. 102006 053 788.2, Jul. 16, 2007.

*Primary Examiner* — Matthew Bella
*Assistant Examiner* — Julian Brooks
(74) *Attorney, Agent, or Firm* — Bacon & Thomas, PLLC

(57) ABSTRACT

A method for detecting color transitions in at least one portion of a document of value by determining for each image elements whether color coordinate values in the color space that are allocated to the image element correspond to a reference color distribution, which is given by at least one predetermined, closed reference surface in the color space, that is given by at least one linear segment predetermined for the document of value and a predetermined distance of the points of the reference surface from the at least one linear segment. The method further has the steps comparing the positions of the image elements whose color coordinate values are disposed inside or outside of the reference surface to predetermined reference positions on the document of value and detecting in dependence on the result of the comparison a presence or an absence of a color transition caused by soiling or color wear.

24 Claims, 5 Drawing Sheets

(56) References Cited

U.S. PATENT DOCUMENTS

| | | | | |
|---|---|---|---|---|
| 4,618,257 | A * | 10/1986 | Bayne et al. | 356/71 |
| 6,125,986 | A * | 10/2000 | Nagase | 194/207 |
| 6,373,964 | B1 * | 4/2002 | Geissler et al. | 382/112 |
| 6,798,900 | B1 | 9/2004 | Sugata | |
| 6,962,247 | B2 * | 11/2005 | Maier et al. | 194/207 |
| 6,970,235 | B2 | 11/2005 | Christophersen | |
| 7,648,016 | B2 * | 1/2010 | Baudat | 194/302 |
| 2002/0117375 | A1 * | 8/2002 | Baudat et al. | 194/302 |
| 2004/0211644 | A1 | 10/2004 | Liu et al. | |
| 2005/0100204 | A1 | 5/2005 | Afzal et al. | |

FOREIGN PATENT DOCUMENTS

| | | |
|---|---|---|
| EP | 0 280 436 | 8/1988 |
| EP | 0 560 023 | 9/1993 |
| EP | 0 718 808 | 6/1996 |
| EP | 0 947 964 | 10/1999 |

* cited by examiner

METHOD FOR IDENTIFYING SOILING AND/OR COLOUR FADING IN THE REGION OF COLOUR TRANSITIONS ON DOCUMENTS OF VALUE, AND MEANS FOR CARRYING OUT THE METHOD

FIELD OF THE INVENTION

The present invention relates to a method for detecting soiling and/or color wear in the area of color transitions in at least one portion of a document of value, an apparatus for carrying out the method, a computer program for carrying out the method, as well as a data carrier with the computer program.

BACKGROUND

Within the framework of the invention documents of value are understood as card- or sheet-shaped objects, which represent for example a monetary value or an authorization and which should therefore not be producible at will by unauthorized persons. Therefore they have properties which are not easy to produce, in particular not easy to copy, whose presence indicates authenticity, i.e. production by a correspondingly authorized authority. Some important examples for such documents of value are chip cards, coupons, vouchers, checks, shares and in particular bank notes.

For reasons of design, for distinctiveness and for protection against simple falsifications documents of value are typically provided with a color design, for example more or less complex color patterns and/or colored representations and/or characters and/or combinations of characters.

When documents of value are used, they can be soiled. Within the framework of the present invention soiling particularly means a change in the color design of the document of value effected through applying or inserting substances on or in documents of value or through irradiating the documents of value with electromagnetic radiation. The soiling of documents of value can in particular occur in the form of spots, for example caused by intentionally or unintentionally applying colored or color-altering liquids, or in the form of colored markings.

Furthermore also color wear can occur. In the following color wear is understood in particular as color changes through fading, abrasion of printing ink and/or washing out of ink by means of water or other solvents for inks of the document of value. Such color wear can occur in particular in bank notes with polymer substrates, if printing inks with which the bank notes are printed do not adhere in a sufficiently stable fashion to the polymer substrates.

In order to guarantee that documents of value are distinguishable and/or that documents of value are recognizable for users in regard of their authenticity, in particular also without the aid of technical devices, it is necessary that soiled documents of value can be detected. Due to the very great number of documents of value in circulation for example in the case of bank notes, detection by machine or automatic detection is desirable.

However, automatically detecting soiling and/or color wear at a preferably high speed is rendered difficult by the fact that on the documents of value color transitions occur, which either correspond to the normal color design of the document of value or are caused by soiling and/or color wear, which do not extend over the complete surface of the document of value. Therein the color transitions do not need to be sharp, such as for example in the area of edges of an image on a document of value, but can also occur gradually over a predetermined segment on the document of value. Soiling and/or color wear consequently have to be detected.

SUMMARY

It is therefore the object of the present invention to provide a method for detecting soiling and/or color wear in the area of color transitions in at least one portion of a document of value, which can be carried out fast, and to provide means for carrying out the method.

The object is solved by a method for detecting soiling and/or color wear in the area of color transitions in at least one portion of a document of value of a predetermined type of document of value on the basis of processing data reproducing color coordinate values of image elements in a color space in dependence on the position of the areas in the portion of the document of value that correspond respectively to the image elements, and of reference data reproducing for a type of document of value a predetermined color reference distribution of color coordinate values in the color space in dependence on reference positions on a document of value of the type of document of value, wherein it is determined for each of the image elements whether the color coordinate values in the color space that are allocated to the image element correspond to the color reference distribution. Therein the color reference distribution is given by at least one predetermined, closed reference surface in the color space, given by at least one linear segment predetermined for the type of document of value, and a predetermined distance of the points of the reference surface from the at least one linear segment. In the method the positions of the image elements, whose color coordinate values were determined as corresponding to the reference distribution, are compared to predetermined reference positions on the document of value, and, in dependence on the result of the comparison, a presence or an absence of soiling and/or color wear is detected in the area of a color transition.

The object is furthermore solved by an apparatus for detecting soiling and/or color wear in the area of color transitions in at least one portion of a document of value of a predetermined type of document of value having at least one interface for capturing processing data reproducing color coordinate values of image elements in a color space in dependence on the position of the areas in the portion of the document of value that correspond respectively to the image elements, and an evaluation device configured to carry out the inventive method on the basis of the processing data captured via the at least one interface and of reference data predetermined for a type of document of value reproducing for a type of document of value a predetermined color reference distribution of color coordinate values in the color space in dependence on reference positions on a document of value of the type of document of value. In particular the evaluation device can be configured so as to check for each of the image elements whether the color coordinate values in the color space that are allocated to the image element correspond to the color reference distribution, wherein the color reference distribution is given by at least one predetermined, closed reference surface in the color space, which is given by at least one linear segment predetermined for the type of document of value and a predetermined distance of the points of the reference surface from the at least one linear segment. It is furthermore configured so as to compare the positions of the image elements whose color coordinate values were determined as corresponding to the reference distribution with predetermined reference positions on the document of value, and to detect, in dependence on the result of the comparison, a presence or an absence of soiling and/or color wear in the area of a color transition caused by soiling.

For detecting color transitions caused by soiling or color wear thus according to the invention processing data are used which reproduce or describe the properties of image elements, which, if combined in accordance with their position, result in an image of the portion. The processing data in particular reproduce the color coordinate values in a predetermined color space for image elements in the predetermined portion of the document of value in dependence on the position of the surface portions on the document of value corresponding to the image elements.

In principle it is sufficient in the method to check only one predetermined portion of a document of value, however preferably several portions or the complete document of value are examined.

In principle the portion needs to be only one-dimensional or strip-shaped, so that the image elements form only one line or column. However, preferably a two-dimensional image of a surface portion is captured.

The color coordinate values can be generated in any desired fashion. For example images can be captured simultaneously or one after another in several spectral ranges, which are preferably predetermined in dependence on the used color space. The images can be captured respectively simultaneously for the complete portion. However, it is also possible to capture the data in that a detection element row and the document of value are moved relative to each other in a direction transversal to the detection element row with a predetermined time program, for example at a predetermined speed, and the data thus captured line by line for the image elements are combined or virtually combined to form an image. Therein the color coordinate values can be obtained either directly by using suitable detection devices or after transforming other captured image data.

Allocating color coordinate values and position can take place in very different ways and in particular also in dependence on the type of capture of the color coordinate values. For example for each image element as processing data the color coordinate values and position coordinate values reproducing the position of the image element on the document of value can be used in a suitable coordinate system. However, if images are used whose image elements are for example captured in the form of a matrix in lines and columns and are stored linearly corresponding to their sequence when passing subsequent lines or columns, it is also possible to use only the position in the sequence of the data for the color coordinate values to indicate the position on the document of value. Further possibilities of allocation are known to the person skilled in the art.

Color transitions and in particular color transitions caused by soiling or color wear are recognized in the method by comparing the color coordinate values or the corresponding processing values with the color reference distribution. The color reference distribution and also the corresponding reference positions therein are predetermined for a certain type of document of value. In the case of documents of value in the form of bank notes the type can for example be predetermined by the type of currency and the denomination of the bank note. The document of value to be examined has a given type of document of value, however which does not necessarily have to be known prior to the examination. The examination can then take place using color reference distributions for different types of document of value. However, in the method the type of document of value to be examined is preferably determined beforehand, for example by means of methods known to the skilled person, so that only a comparison with the color reference distribution of the determined type of document of value has to take place.

The color reference distribution is based on documents of value of the predetermined type. However, it does not necessarily have to exactly reproduce the state of a document of value of the given type in new condition, i.e. after its production and before its use; rather, it can also take account of tolerances caused by usually occurring soiling and/or color wear which are not regarded as interfering. Merely a color reference distribution is then used, which permits certain deviations from an ideal state. However, it is also possible to take account of the occurrence of admissible soiling and/or color wear in the form of the criterion under which conditions color coordinate values correspond to the color reference distribution. Therein a distribution of color coordinate values can in particular be understood in such a way that the color coordinate values can be disposed within a volume of the color space that is predetermined and thus specifies the distribution.

To achieve a high processing speed, in the method the color reference distribution is provided by at least one predetermined, closed reference surface in the color space, given by at least one linear segment in the color space predetermined for the type of document of value and a predetermined distance of the points of the reference surface from the at least one linear segment. Consequently the reference surface encloses an area of the color space in which color coordinate values of image elements are disposed which correspond to a color transition occurring in the examined portion on a document of value that is to be regarded as still acceptable or unsoiled. The reference surface can be given by only one linear segment. However, it is also possible that the reference surface is given by several segments, whose distance from each other can be greater or preferably smaller than the predetermined distance. In particular the reference surface can be defined through a polygonal chain in connection with the predetermined distance, so that even complicated color transitions predetermined for a type of document of value, for example between three colors, can be reproduced and detected.

It is consequently determined for each of the image elements whether the color coordinate values in the color space allocated to the image element correspond to the color reference distribution. For this purpose a suitable criterion can be used, in which the reference data are considered.

The advantage of this type of comparison and in particular of the representation of the reference surface is that a check whether color coordinate values correspond to the color reference distribution can be carried out very quickly and easily, since the geometric structure in the color space is very simple.

Surprisingly, it has turned out that this type of predetermination of the color reference distribution in the most important color spaces can be used very well in particular for documents of value in the form of bank notes. This can probably be put down to the circumstance that on or in bank notes no very strongly saturated colors are used.

The method can in particular be carried out automatically by means of a corresponding apparatus. In the inventive apparatus the evaluation device can be configured in principle as any desired analog, mixed analog-digital or purely digital circuit. It is also possible that it comprises only a so-called “field programmable gate array” (FPGA), which has the advantage that corresponding components can be adjusted for the method to be carried out merely by pre-programming, but function like a digital circuit upon its execution. In this way the production costs can be kept low in the case of small series. However, preferably the evaluation device has at least one processor and one memory, in which an inventive computer program executable by the processor or a program or computer program for executing the inventive method is stored.

The object is consequently furthermore solved by a computer program for detecting soiling and/or color wear in the area of color transitions in at least one portion of a document of value of a predetermined type of document of value, having instructions for at least one processor, upon whose execution the processor carries out the inventive method and in particular, on the basis of processing data reproducing the color coordinate values of image elements in a color space in dependence on the position of the areas in the portion of the document of value that correspond respectively to the image elements, and of reference data reproducing for a type of document of value a predetermined color reference distribution of color coordinate values in the color space in dependence on reference positions on a document of value of the type of document of value, determines for each of the image elements whether the color coordinate values in the color space that are allocated to the image element correspond to the color reference distribution, wherein the color reference distribution is given by a predetermined closed reference surface in the color space given by the at least one linear segment predetermined for the type of document of value and a predetermined distance of the points of the reference surface from the at least one linear segment, compares the positions of the image elements whose color coordinate values were determined as corresponding to the color reference distribution with predetermined reference positions on the document of value, and, in dependence on the result of the comparison, detects a presence or an absence of soiling and/or color wear in the area of a color transition. Soiling and/or color wear in the area of the color transition will show in that the corresponding color coordinate values do not correspond to the color reference distribution.

Such a computer program can in particular be stored in the memory of the apparatus.

A further object of the invention is a data carrier on which an inventive computer program is stored. As data carrier in particular optical data carriers such as for example CD or DVD, magneto-optical data carriers, magnetic data carriers such as for example hard disks and semiconductor memories, for example EEPROMs or flash memories come into question, whose content is accessible by a corresponding device of a computer.

Within the framework of the invention a “processor” is understood as any processor, for example a microcontroller or a multi-purpose processor or a digital signal processor, or a combination with a multipurpose processor and/or a signal processor and/or a microcontroller and/or an FPGA. The computer program is then designed in accordance with the present processor. In particular the evaluation device can have at least one FPGA which is programmed in such a fashion that at least parts of the inventive method are executable by the FPGA. Thereby the execution speed of the computer program can be increased, since an FPGA can have a greater execution speed for certain operations than a multi-purpose processor or a signal processor.

The use of a programmable evaluation device has the advantage that the apparatus can be adapted easily to new types of documents of value.

The examination whether the color coordinate values for the image elements correspond to the color reference distribution can in principle take place in any desired fashion. However, it is preferred in the method that for checking whether color coordinate values for an image element correspond to the color reference distribution it is checked whether a point in the color space corresponding to the color coordinate values is disposed inside or outside of the reference surface. In the computer program preferably for this purpose the instructions are given in such a fashion that, upon their execution, for checking whether color coordinate values for an image element correspond to the color reference distribution, the processor checks whether a point in the color space that corresponds to the color coordinate values is disposed inside or outside of the reference surface. Therein only one of the alternatives needs to be checked, since it can be inferred from the circumstance that the point is disposed inside the reference surface, which is also understood in such a way that it is disposed on the reference surface, that it is not disposed outside, and vice versa. Such a check can be carried out very quickly.

In principle the reference surface can be predetermined in any desired fashion, for example through nodes or an approximation through one- or multidimensional splines or a sum of orthogonal functions. However, it is preferred that, for checking whether a point that corresponds to the color coordinate values is disposed inside or outside of the reference surface, or whether the color coordinate values allocated to the respective image element correspond to the color reference distribution, a value is determined which represents the distance of the point that corresponds to the color coordinate values from the at least one segment. In the computer program the instructions are then preferably given in such a fashion that upon their execution, for checking whether a point that corresponds to the color coordinate values is disposed inside or outside of the reference surface, or whether the color coordinate values allocated to the respective image element correspond to the color reference distribution, the processor determines a value reproducing the distance of the point that corresponds to the color coordinate values from the at least one segment. Such a determination can take place particularly quickly. Moreover, only little memory space is required for representing the color reference distribution or the reference surface. As distance therein in particular the distance in the metrics of the color space can be used, preferably the Euclidian distance. However, the determined value only needs to reproduce the distance; for the determination of the distance as a rule requires complicated and/or slow operations such as for example the drawing of a root, so that if for example the squared distance is used as a value to reproduce the distance, the execution of the program can be strongly accelerated. In the case that the color reference distribution is given by two or more segments or a polygonal chain, as a criterion that the color coordinate values for an image element of the color reference distribution have a distance from at least one of the segments which is smaller than the predetermined distance. By means of a criterion for the maximum admissible distance it can then be decided for the respective color-space point whether or not it corresponds to the reference distribution. It can then be marked or stored accordingly.

In principle in the method any desired color spaces can be used. However, preferably color spaces with at least three dimensions are used, but it is also possible to use color spaces of even higher dimensions. Furthermore as color space also such a color space can be used which is specific for the sensor device used for capturing the processing data. However, also any other space can be understood as color space in which points are allocated to respectively corresponding points in a different color space through a bijective transformation. In particular for example the RGB or the HSI color space can be used as color space.

In order to facilitate a transferability of the color reference distribution between different devices, in the method preferably such a color space is used as color space which is defined in a device-independent fashion. In the computer program the instructions are then preferably given in such a fashion that upon their execution the processor uses such a color space as color space that is defined in a device-independent fashion. In particular for example a normalized color space such as the CIE XYZ color space can be used as color space.

Whether soiling or color wear interferes with the visual appearance of a document of value or not depends on the ability of a viewer to distinguish colors. In the method consequently preferably such a color space is used as color space which is linearized in regard of the perception of color differences by humans. In the computer program the instructions are then preferably given in such a fashion that upon their execution the processor uses such a color space as color space which is linearized in regard of the perception of color differences by humans. This is in particular to be understood in such a fashion that the coordinates of the color space are chosen so that visual distances between colors perceived by human viewers are approximately proportional to distances between the colors in the color space. As color space in particular a color space such as the CIE L*a*b color space in one of the known variants, the Hunter Lab color space or the CIE L*u*v color space can be used. The use of such color spaces has the advantage that the criterion specifying under which circumstances color-value coordinate values correspond to the color reference distribution can be formulated using distances in the color space in a fashion that is simple, but applicable on the actual handling of the documents of value by humans.

In the case that one of the above-mentioned special color spaces is used, it is thus preferred in the method that the predetermined distance is given in dependence on a minimum distance of two color coordinate values in the color space for such colors which can still be recognized as different by a predetermined viewer under predetermined viewing conditions. For this purpose in the computer program the instructions are preferably given in such a fashion that upon their execution by the processor the distance is given in dependence on a minimum distance of two color coordinate values in the color space for colors which can still be recognized as different by a predetermined viewer under predetermined viewing conditions. As predetermined viewer in particular also a fictitious viewer can come into question, whose perception is given by an average value over the perception properties of a plurality of real humans. In particular, for example if a CIE L*a*b color space is used, the color reference distribution and the above-mentioned criterion can be chosen in such a fashion that color coordinate values for an image element are regarded as corresponding to the color reference distribution if the distance in the color space from the at least one segment or from at least one of several segments is smaller than a value which is the sum of the predetermined distance and a value ΔE, which is between 1 and 2, depending on the sharpness of the required distinction. If also color deviations caused by variations in production are to be taken into account, a larger value can also be chosen.

In principle the same predetermined distance can be used for different types of documents of value. In a further development of the method it is preferred, however, that the distance is predetermined in dependence on the type of document of value. In the computer program for this purpose the instructions are preferably given in such a fashion that upon their execution by the processor the distance is predetermined in dependence on the type of document of value. This embodiment has the advantage that for different types of document of value respectively different criteria for the admissible soiling and/or color wear can be defined, thereby improving the assessment of the status of the documents of value. Depending on the application, the type of a document of value to be examined can be input manually in the apparatus or can be determined automatically by a machine with which the apparatus is coupled.

In principle in the method directly captured image data, which are transformed into the used color space if required, can be used as processing data. However it is preferred in the method that for generating the processing data image data of pixels of a captured image of the portion are used from which the color coordinate values and the positions can be determined, and that the processing data for an image element are determined using a low-pass filtering of the image data. In the computer program the instructions are then preferably given in such a fashion that, upon their execution for generating the processing data, the processor uses image data of pixels of a captured image of the portion, from which the color coordinate values and the positions can be determined, and determines the processing data for an image element using a low-pass filtering of the image data. This embodiment has the advantage for many types of documents of value with very fine patterns, in particular bank notes, that color transitions in consequence of the fine patterning do not need to be taken into account in the examination, thereby facilitating the detection of soiling and/or color wear, which as a rule occur extending over a large surface, in particular on a surface greater than 0.5 $mm^2$. Within the framework of the low-pass filtering then preferably also the spatial resolution is reduced, i.e. the number of image elements per displayed surface.

The apparatus can preferably be combined with a sensor for capturing image data of pixels. Therefore also a checking apparatus is the object of the invention, having a sensor for capturing image data of pixels that correspond to areas in a portion of a document of value, and an inventive detection device connected to the sensor for transmitting the image data.

In particular in the method for generating the processing data image data of pixels of a captured image of the portion can be used, from which the color coordinate values and the positions can be determined, and the processing data for an image element can be generated using the image data of at least two pixels. In the computer program for this purpose the instructions can be given in such a fashion that upon their execution, for generating the processing data, the processor uses image data of pixels of a captured image of the portion, from which the color coordinate values and the positions can be determined, and generates the processing data for an image element using the image data of at least two pixels. In particular the image data of the at least two pixels which correspond to the same portion of the document of value as the image element, can be used for a local low-pass filtering, for example to generate an average value, which is weighted if required. Such a local low-pass filtering can frequently be carried out much more quickly than a non-local low-pass filtering, which can for example also be carried out in the spatial frequency domain. Preferably more than two pixels are used, particularly preferably at least the directly adjacent pixels.

Once the color coordinate values or image elements have been determined which correspond to the color reference distribution, their position, which can more exactly be understood as the position of the surface portion on the bank note corresponding to the image elements, is compared with reference positions for it. Thereby it can be determined whether the detected color transition is in a predetermined position.

Since the position of an examined document of value relative to the sensor used for capturing the image data can generally vary, before or upon comparing the positions a transformation of the positions of the image elements or of the reference positions can take place, so that a better congruence of the positions with the reference positions is achieved.

The reference positions can for example be predetermined by corresponding position coordinate values. In this case it can be checked for comparison whether the determined positions are disposed within a predetermined distance from these reference positions. However, it is also possible that the reference positions are given by a preferably two-dimensional area. For the purpose of comparison it is then merely necessary to determine whether the positions of the image elements are disposed within the area.

The result of the comparison can consist in that the image elements whose color coordinates correspond to the reference distribution and whose positions correspond to the reference distribution, have been determined. In dependence on the comparison it is determined in the method whether a presence or an absence of the soiling and/or color wear is detected in the area of the color transition. For this purpose in principle any desired criteria can be used.

As a criterion for an admissible state of the document of value preferably such a criterion is checked which depends on the number of image elements which were determined as corresponding to the predetermined color transition, and/or the number of image elements which were determined as not corresponding to this color transition. For example a maximum number of image elements can be indicated which do not correspond to the predetermined color transition. The criterion, in particular also the number, can be predetermined in dependence on the type of document of value.

A further object of the invention is an apparatus for processing documents of value having an inventive examining device.

It is furthermore the object of the invention to provide a method for determining a reference surface for an inventive method for detecting soiling and/or color wear, wherein for a predetermined number of documents of value of a predetermined type of document of value such respectively allocated processing data are determined which reproduce color coordinate values of image elements in a color space in dependence on the position of the areas that correspond respectively to the image elements in the portion of the document of value, wherein first components reproducing average values over the color coordinates, and components reproducing correlations between the color coordinates, of a matrix in the color space or a different color space are determined from the processing data, wherein direction data specifying the eigenvectors associated with the two largest eigenvalues of the matrix are determined, wherein data defining the linear segment are determined from the direction data in such a fashion that the middle of the segment is specified by the average values, the direction of the segment is specified by the direction of the first eigenvector, and wherein the length of the segment and the predetermined distance from the segment is determined in dependence on the largest eigenvalue and/or the second-largest eigenvalue or the parameter reproducing the correlation along the segment and the largest correlation in a sub-space orthogonal to the segment. Therein the sub-space has one dimension less than the original color space, but can have resulted therefrom through bijective transformation.

This method permits determining the reference surface or the data specifying it in a simple fashion. As a basis documents of value of a predetermined type can be predetermined. Furthermore at least the portion of the documents of value is predetermined which is later also used in the detection of soiling and/or color wear.

According to a first alternative the components of the correlation matrix can be determined and used as components of the matrix.

However, it is also possible to determine and use the components of the covariance matrix as components of the matrix.

For determining the eigenvalues in principle the captured color coordinate values can be used as processing data or part of the processing data. However, it can be advantageous to first transform the processing data into a different color space that is for example device-independent, through transformation of the color coordinates. In particular the processing data used for determining the components reproducing the average values and the components reproducing correlations between color coordinates can be color coordinates in a Lab color space.

The data specifying the reference surface can in principle be stored for the color space used for their determination. Preferably the data specifying the reference surface are stored after transformation into values that are valid for the color space which is later also used for detecting soiling and/or color wear.

Although the methods described above were described for colors in a narrower sense, i.e. in the visible range, the color space can also comprise at least one dimension for non-visible optical radiation, for example IR radiation in a predetermined wavelength range, and can then for example be four-dimensional.

BRIEF DESCRIPTION OF THE DRAWINGS

In the following the invention will be explained in greater detail by way of example with reference to the drawings. The figures are described as follows.

DETAILED DESCRIPTION OF EXEMPLARY EMBODIMENTS OF THE DISCLOSURE

Figure 1:
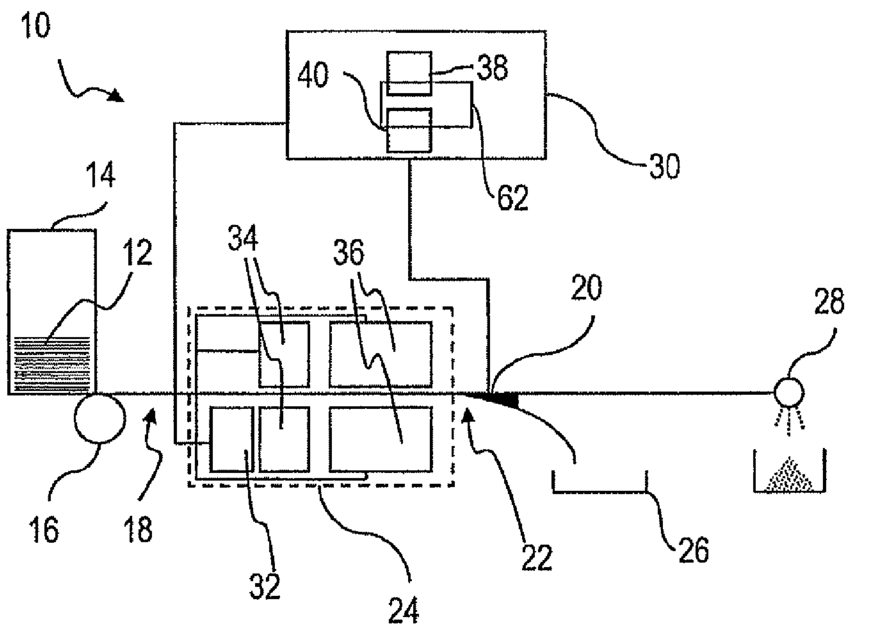
FIG. 1 a schematic view of an apparatus for processing bank notes.

FIG. 1 shows an apparatus 10 for determining a state of documents of value, in the example an apparatus for processing bank notes, which serves, among other things, for determining the state of documents of value 12 in the form of bank notes. The apparatus 10 has an input pocket 14 for inserting documents of value 12 to be processed, a singler 16 that can take hold of documents of value 12 in the input pocket 14, a transport device 18 with a switch 20, and downstream of the switch 20 an output pocket 26 as well as a shredder 28 for destroying bank notes. Along a transport path 22 given by the transport device 18 upstream of the switch 20 and downstream of the singler 16 a sensor arrangement 24 is arranged, which serves to detect properties of documents of value 12 fed in a singled state, and to generate sensor signals reproducing the properties. A control and evaluation device 30 is connected at least with the sensor arrangement 24 and the switch 20 via signal connections and serves to evaluate sensor signals of the sensor arrangement 24 and to control at least the switch 20 in dependence on the result of the evaluation of the sensor signals.

For this purpose the sensor arrangement 24 comprises at least one sensor; in this embodiment three sensors are provided, namely a first sensor 32, in the example an optical sensor for detecting color properties, which captures optical radiation remitted by the document of value, a second sensor 34, in the example also an optical sensor for capturing special spectral security features of the documents of value, which also captures optical radiation remitted by the document of value, and a third sensor 36, in the example an acoustic sensor, more exactly an ultrasonic sensor, which captures ultrasonic signals coming from the document of value, in particular transmitted by a document of value.

While a document of value is transported past, the sensors 32, 34 and 36 corresponding to their function, capture properties of scanning areas on the document of value specified by the relative position of the sensors to the document of value, wherein corresponding sensor signals are generated. Therein each sensor can have a different spatial resolution, i.e. the size and distribution of the captured scanning areas on the document of value can vary in dependence on the respective sensor and the transport speed used. To each of the scanning areas a location is allocated which reproduces the position of the scanning areas for the respective sensor to each other and/or relative to the document of value.

From the analog or digital sensor signals of the sensors 32, 34, 36 the control and evaluation device 30 determines, upon evaluating the sensor signals, at least one property of at least one scanning area and/or at least one property of the document of value, which are relevant for checking the bank notes in regard of their state. Preferably several such properties are determined. Furthermore by means of the signals of the sensor 34 the authenticity of the documents of value is checked. The properties of the documents of value characterize the state of the documents of value, in this example the state of the bank notes regarding marketability or fitness for circulation, i.e. the suitability for being used further on as a means of payment. As corresponding properties of documents of value in this example particularly the presence of soiling and/or color wear or spots, as well as the presence of tears, adhesive tape, dog ears and/or holes, and/or the absence of parts of the documents of value are used. These properties of documents of value can be determined in dependence on sensor signals of only one of the sensors 32 or 34 or at least two of the sensors.

In addition to corresponding interfaces for the sensors the control- and evaluation device 30 for this purpose particularly also has a processor 38 and a memory 40 connected to the processor 38, in which at least one computer program with program code is stored, upon the execution of which the processor 38 controls the apparatus or evaluates the sensor signals, in particular for determining an overall state of a checked document of value, and activates the transport device 18 in accordance with the evaluation.

In particular the control- and evaluation device 30, more exactly the processor 38 therein, after determining the properties of the document of value can check a criterion for the overall state of the document of value, in which at least one of the properties of the document of value is considered and/or which depends on at least one of the properties of the document of value. In the criterion in particular further reference data for specifying a still admissible state of the document of value can be considered, which are predetermined and stored in the memory 40. The overall state can for example be given by two categories "still fit for circulation" or "marketable" or "to be destroyed". In dependence on the determined state the control- and evaluation device 30, in particular the processor 38 therein, activates the transport device 18, more exactly the switch 20, in such a fashion that, corresponding to its determined overall state, the checked document of value is transported to the output pocket 26 to be deposited or to the shredder 28 to be destroyed.

For processing documents of value 12, documents of value 12 inserted in the input pocket 14 in the form of a stack or individually, are singled by the singler 16, and are fed in a singled state to the transport device 18, which feeds the singled documents of value 12 to the sensor arrangement 24. This detects at least one property of the documents of value 12, wherein sensor signals are generated which reproduce the property of the document of value. The control- and evaluation device 30 detects the sensor signals, in dependence on these determines a state and the authenticity of the respective document of value, and in dependence on the result activates the switch 20 in such a fashion that for example such documents of value which are still usable are fed to the output pocket 26 and documents of value which are to be destroyed are fed to the shredder 28 to be destroyed.

Pieces of adhesive tape on the documents of value 12 can for example be detected by means of the sensor 36. For characterizing the state of the bank notes the control- and evaluation device 30 for this purpose can for example determine the number of pieces of adhesive tape or the total length or total surface of the pieces of adhesive tape from the sensor signals of the sensor 36.

For determining the overall state of the bank notes the control- and evaluation device 30 uses the already mentioned criterion in which at least one of the properties can be considered. The individual values can for example be combined in one criterion, for example by means of a linear combination. For determining the overall state of the bank notes, the control- and evaluation device 30 then compares the linear combination of the properties characterizing the state of the bank notes with a predetermined value and decides for example whether the state of the bank notes is good or bad, i.e. whether they are fit for circulation or not. It is thus achieved that a bank note, which already has considerable soiling and/or color wear, however which on its own would not yet lead to the bank note's state to be determined as bad, is determined as bad if the bank note has additionally e.g. also only a small number of spots and/or tears, etc.

Figure 2:
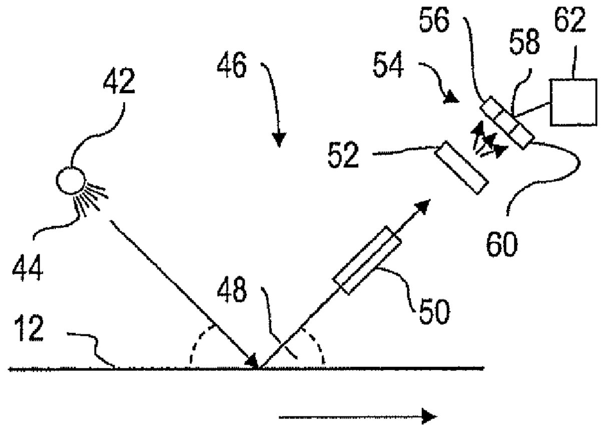
FIG. 2 a schematic view of an optical sensor and a color evaluation device in a control- and evaluation device of the apparatus for processing bank notes in FIG. 1, FIG. 3 a schematic partial view of three detection element rows of the apparatus for processing bank notes in FIG. 1 from the direction of an impinging beam of rays, FIG. 4 a schematic view of an example for a document of value to be examined in the form of a bank note, FIG. 5 a schematic view of a color transition with the aid of a density of dots, FIG. 6 a schematic view of color coordinate values of image elements of the color transition in FIG. 5 in an L*a*b color space, FIG. 7 a strongly simplified flow chart for a method for detecting color transitions which can be carried out in the apparatus for processing bank notes in FIG. 1, FIG. 8 a schematic view of color coordinate values of image elements of the color transition in FIG. 5 in an RGB color space, and FIG. 9 a schematic view of a reference surface in an L*a*b color space for two color transitions which have one color in common.
Figure 3:
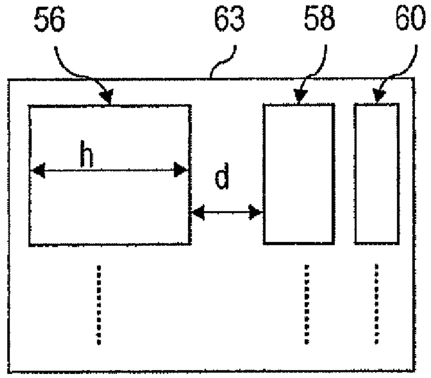

The sensor 32, which serves for capturing colors of the documents of value 12 in a spatially resolved fashion, is shown in greater detail in the FIGS. 2 and 3. In the following it is described only briefly; a comprehensive description can be found in the patent application WO 2006/018283 filed by the applicant, the content of which is hereby included in the description by making reference to it. The sensor 32 is configured as a line sensor, past which a document of value is transported at a constant speed for capturing an image. During the passage the sensor 32 captures line images, which, if combined in accordance with the sequence of capturing, result in a two-dimensional image of the document of value.

The sensor 32 has a light source 42 for illuminating a document of value 12 with optical radiation 44 in the visible wavelength range, preferably white light. In the beam path of the illuminating radiation 44 an optional condenser optical system for bundling the emitted illumination radiation 44 is arranged, which is not shown in the figures. To detect the optical radiation remitted by the document of value 12, in the following also referred to as detection radiation, a color capturing device 46 is provided.

The color capturing device 46 along a detection beam path has an aperture 48 which is provided for limiting the image field and forms an entrance slit, and an array of auto-focusing lenses 50, whereof in FIG. 2 only one row is shown by way of example, of which again only the outermost lens is visible. The auto-focusing lenses 50 direct the detection radiation onto a spatially-spectrally dispersing device 52, which splits the optical radiation into spectral components which propagate, in accordance with their spectral composition, along different spatial directions. A detection optical system, not shown in the figures for the sake of clarity, focuses the spectral components onto a spatially resolving detection device 54 having several rows 56, 58 and 60 of detection elements that correspond to the number of colors to be detected, in the example three, are arranged parallel to the direction of the entrance slit, are also referred to as detector rows, and capture the intensity of the spectral components along each respective row and generate corresponding detection signals.

The aperture 48 arranged near the document of value 12 to be checked preferably forms an entrance slit with a slit width between 0.1 and 0.2 mm and a typical length that corresponds to the width of the documents of value to be expected, in the example of bank notes between 10 and 200 mm, preferably approximately 100 mm.

The auto-focusing lenses 50 are generally cylindrical optical elements of a material having a refraction index that decreases parabolically from the optical axis of the cylinder to its mantle. By using such lenses 50 a 1:1 imaging of the partial area of the document of value 12 to be examined onto the dispersing device 52 is achieved, which imaging is independent of the distance between the document of value and the image and does not need to be adjusted.

As dispersing device 52 for example a diffractive element such as an optical grating can be used. However, in this embodiment a prism of crown glass with a prism angle of approximately 60° is used. The dispersing device 52 is arranged in such a fashion that the spectral components extend parallel to a plane which extends in good approximation orthogonally to the direction of the entrance slit.

For detecting the spectral components in a fashion that is spatially resolved along a row, the detection device 54 is used, which, for generating image data which serve colors of an examined document of value, connected with a color evaluation device 62, i.e. an apparatus for detecting soiling and/or color wear in the area of color transitions according to a first preferred embodiment of the invention, which in this example is integrated in the control- and evaluation device 30, however which is not necessary.

The detection element rows 56, 58 and 60 are arranged on a common carrier 63, which is shown only in FIG. 3 for the sake of clarity.

In the direction of the rows the dimensions of the detection element rows 56, 58 and 60 are constant. The width of the detection elements of one row, i.e. the dimension in the direction of the row, and their distance in the direction of the line are respectively equal and predetermined by the required resolution, in the example approximately 0.2 mm for a resolution of 125 dpi.

In order to obtain detection signals as directly as possible, which correspond to the human color perception as closely as possible, the detector rows 56, 58 and 60 differ in regard of the height h of the detection elements of the respective row, i.e. their dimension orthogonal to the direction of the row (cf. FIG. 3). Consequently, in accordance with their height, the detection elements of different rows receive spectral ranges of differing widths, so that the sensitivity spectrum of the detection device 54 is influenced accordingly. To select the position of the spectral bands the distances d of the detector rows 56, 58 and 60 can differ from each other. The heights of the detection elements and the distances of the detector rows in the direction of the spatial expansion of the spectral components, i.e. transversal to the direction of the rows, are chosen in such a fashion that a detection is possible which resembles the human color perception at least approximately, or that the detected spectrum is adapted at least approximately to the color perception of the human eye.

The individual detector rows can for example be based on silicon. Therein, for the purpose of an approximation to the color perception of the human eye for detecting spectral components of the "blue" and the "infrared" spectral range, the detector rows 56, 58 and 60 have to have a comparatively great height, since silicon is less sensitive to these wavelength ranges than to other wavelength ranges.

A further adaptation to the human color perception can be achieved if the captured spectral components are weighted in the color evaluation device 62 in dependence on or independently of the geometry of the detector rows 56, 58 and 60. The spectral components can in particular be weighted individually in dependence on their intensities by means of multiplicative weighting factors, wherein the weighting factors are dependent on the spectrum to be approximated. It is for example established in a silicon detector that the spectral component in the "red" spectral range has in total an intensity value $I_{actual}$, but that the value should amount to $I_{reference}$. For calibrating the weighting factor is adjusted from the outset in such a fashion that a captured intensity value is transformed into a calibrated value using the weighting factor. This adaptation takes place for all spectral components to be captured upon calibrating the complete apparatus.

It is assumed here that after the calibration the color evaluation device 62 can generate image data from the detection signals of the detector rows 56, 58 and 60, which can be used in good approximation as color coordinates in the normalized CIE XYZ color space.

For capturing a color image of a document of value 12, the latter is transported past the color capturing device 46 at constant speed, wherein at constant time intervals intensity data are captured in a spatially and color-resolved fashion by means of the detection element rows 56, 58 and 60. The intensity data represent image data describing the properties of pixels of a line image reproducing the linear area of the document of value 12 captured by the color capturing device 46. By combining the line images in accordance with the chronological sequence of capture, i.e. by correspondingly allocating the image data, an image of the document of value with pixels is obtained.

Figure 7:
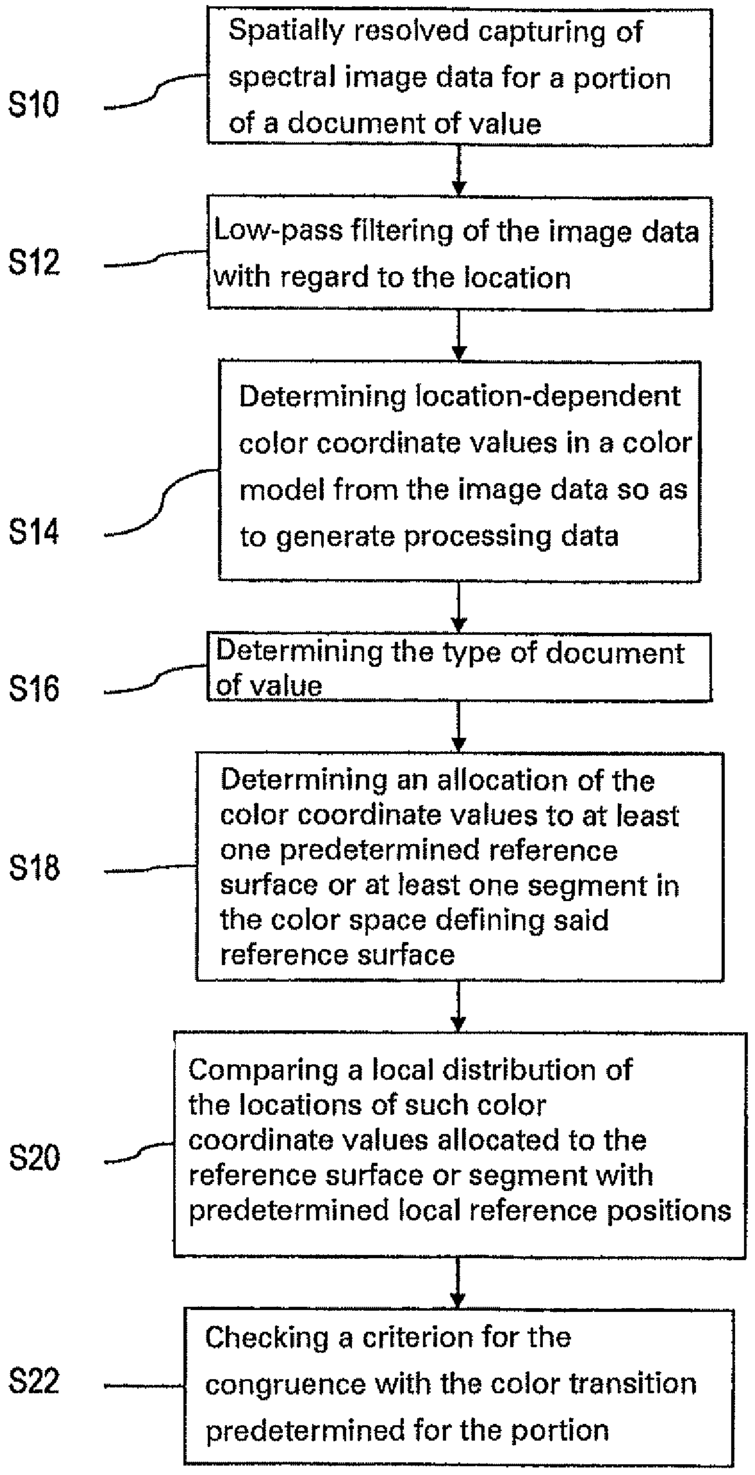

The apparatus 62, which is integrated in the control- and evaluation device 30, as already explained above, serves to carry out a method for detecting color transitions on examined documents of value. For detecting color transitions, in the memory 40 a computer program is stored, upon the execution of which by the processor 38 the method explained in the following and illustrated in FIG. 7 is carried out. Together with a corresponding software module of the computer program the processor 38 therein constitutes an interface for capturing processing data, which is not shown explicitly in the figures.

Figure 4:
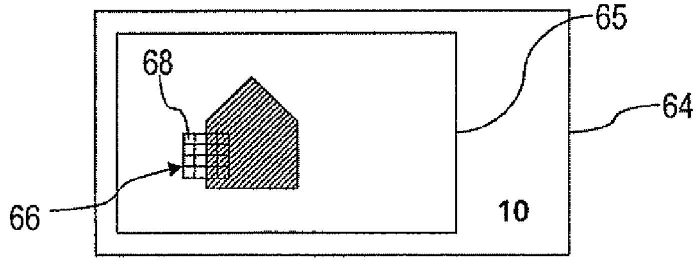

The method is based i. a. on the following fundamentals, which are explained by way of example with reference to a bank note 64 as document of value 12 shown in FIG. 4. The bank note 64 has an image area 65 having surfaces of different colors.

Figure 5:
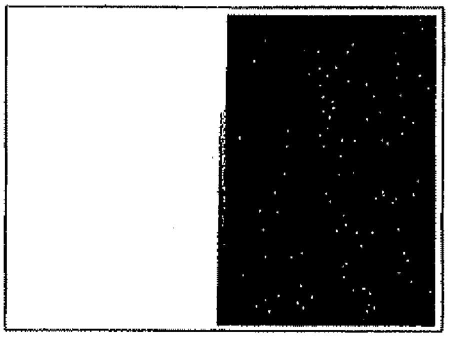

On the authentic bank note 64 that is assumed to be freshly printed and that belongs to a predetermined type of bank note, there is located in particular a portion 66 on which there is located a color transition from a first color, deep purple, to a second color, light yellow. In FIG. 5 a part of the color transition is shown again, using black dots which are intended to illustrate the proportion of the deep purple.

If this portion 66 predetermined for the type of bank note is divided into square image elements 68 that completely cover the portion 66 without overlapping, it is possible to allocate to each of the image elements color coordinate values or a color point represented by the former in a color space, in this example the CIE L*a*b color space as a color space that is defined device-independently and linearized in regard of the perception of color differences by humans, and a corresponding location or a corresponding position on the document of value 12.

In a representation of the color points of the portion 66 in the coordinate system of the color space (cf. FIG. 6) the color points are disposed in very good approximation on a segment 70 connecting two end points T1 and T2, which correspond to the colors between which the transition occurs.

In particular a feature portion of the color space can be expressed by the segment 70, more exactly its end points, and a minimum distance Δe, which is chosen in such a fashion that the distance of the predetermined points from the segment is not greater than the minimum distance. The segment and the minimum distance Δe define a closed surface in the color space.

Soiling and/or color wear of the bank note, which are only moderate and uniform and still permit a further use of the bank note will cause the captured color points not to be disposed inside the surface and in particular exactly on the segment 70, but to have a certain distance from the same. If the distance is only small, a person viewing the bank note will notice no or only little deviation from a freshly printed bank note. For the purpose of quantification for example the criterion can be used that a captured color point does not represent a relevant deviation in the color space provided that its distance from the segment 70 is smaller than a predetermined maximum distance ΔE, in the example a maximum distance of 2. Therein the maximum distance is smaller than Δe, which does not need to be calculated in the detection in this embodiment, but only plays a role for the choice of ΔE. If the distance is greater a clear color deviation can be detected, so that the bank note is no longer fit for circulation, since a person would notice color deviations compared to freshly printed bank notes. In a different embodiment the maximum distance ΔE can also be determined as a sum of Δe and a further value which describes a minimum distance of two color points in the color space which are only just recognized as different by the viewer.

To be able to establish whether a color point is disposed within the maximum distance, a color reference distribution is defined for the color points or the corresponding color coordinate values of the predetermined portion of a freshly printed document of value or a freshly printed bank note of a predetermined type. This is given by a closed reference surface 72, which can be given on the basis of the maximum distance and the segment, for example its end points, and whose points in particular have exactly the maximum distance from the segment 70. Color points which are disposed inside or on the reference surface 72 correspond to the color reference distribution, others do not.

Furthermore it has to be established that the image elements in the portion of the bank note which correspond to the color points that correspond to the color reference distribution are also distributed in accordance with reference positions predetermined for the predetermined type of bank note.

Thus if a bank note of the predetermined type of bank note is examined and if color points are disposed outside the reference surface, these are to be attributed to soiling and/or color wear. In contrast, color points inside or on the reference surface belong to a color transition in the portion of a bank note of the predetermined type, if their local distribution corresponds to the local reference distribution predetermined by the reference positions.

In order to enable a quick execution of the method, it is expedient to check for one color point only whether this color point has a distance from the segment 70 which is smaller than the maximum distance ΔE.

Therein two cases are to be distinguished. If a color point $P_1$ is disposed in such a fashion that the perpendicular extending through the color point onto a straight line that extends coaxially to the segment intersects the segment, the distance between the color point $P_1$ and the foot of the perpendicular is the searched distance (cf. the color point $P_1$ in FIG. 6).

However, if the perpendicular does not intersect the segment (cf. color point $P_2$ in FIG. 6), the smaller of the two distances of the color point from the end points $T_1$ and $T_2$ of the segment is to be used as the distance of the color point from the segment.

The distance of a point P, with color space vector p extending from the origin of the color space or the color space coordinate system to the point P, from a segment with the end points $T_1$ (with color space vector $t_1$) and $T_2$ (with color space vector $t_2$) can be determined as the length of the following distance vector D:

$$D=p-t_1-e_{21}\min(|t_2-t_1|,\max[0,(p-t_1)e_{21}]),$$

wherein $$e_{21}=\frac{t_2-t_1}{|t_2-t_1|}$$

is the unit vector in the direction of $t_2-t_1$.

If ΔE signifies the maximum distance, a color point thus corresponds to the color reference distribution if the criterion for the maximum admissible distance $D^2<(\Delta E)^2$ is fulfilled.

In this example it is assumed for the sake of simplicity that for all predetermined types of documents of value a portion is chosen in such a fashion that only one predetermined color transition should occur therein. Generally, several portions can be examined; if for at least one of the portions the absence of a color transition predetermined for the portion is detected, the document of value is separated as unfit for circulation. The method in this first embodiment is carried out as follows (cf. FIG. 7).

In step S10 first an image of the portion of the document of value is captured. For this purpose the document of value is moved past the color capturing device 46, in particular the detection device 54, in the example at a constant transport speed; during this movement image data are captured by means of the detector rows or detection element rows 56, 58 and 60 at time intervals that are predetermined in dependence on the transport speed, the image data reproducing colors of pixels in accordance with the respective detector row, which, if arranged in the sequence of their capture, reproduce an image of the examined portion of the document of value. The image data for one pixel thus comprise the color values, in the example the color coordinate values in the CIE XYZ color space, as well as the location or the position of the pixel on the bank note.

These image data are then subjected to low-pass filtering in step S12. In the example for this purpose for one selected pixel the values of each of the color coordinates are replaced by the average value of the values of the respective color coordinate over the selected pixel and pixels at a predetermined averaging distance. Here for example respectively for one selected pixel the values of each of the color coordinates can be replaced by the average value of the values of the respective color coordinate over the pixels in a square in the center of which the selected pixel is disposed. The side length of the square is specified in units of the length of the pixel edges and in the example amounts to at least 5 pixels. By this low-pass filtering it can be achieved that fine lines whose color diverts from the color of the areas adjacent to the lines, are not detected as individual color transitions. Such color transitions are irrelevant for the examination of the state of the bank notes.

In step S14 the low-pass filtered image data of the pixels are transformed into processing data of the pixels, i.e. image elements corresponding to the same areas of the image, by transforming the color coordinate values in the image data into the CIE L*a*b color space using known formulas. These color coordinate values correspond to one color point in the color space, as explained above. The CIE L*a*b color space is characterized in that distances between color points in this color space reproduce at least approximately quantified differences between colors perceived by humans. The processing data furthermore comprise the location or the position of the pixel on the bank note.

In step S16 a type of the examined document of value is determined from the image data of the pixels using known methods; one example for such a method is described in DE 100 45 360 A1. This determined type serves for predetermining the color reference distribution and the reference positions. For this purpose in the memory 40 of the control- and evaluation device 30 a list of bank note types is stored, comprising different denominations for at least one currency area with data on corresponding color reference distributions given by the color coordinate values of end points of segments in the CIE L*a*b color space and the maximum distance ΔE and corresponding reference positions.

In step S18 it is checked for which image elements disposed in the predetermined portion the color coordinate values in the processing data or the corresponding color points correspond to the color reference distribution for the type of bank note determined in step S16.

As described above, for this purpose the square values of the distances of the color points from the respective segment are determined and compared to the square value of the maximum distance. If for a color point or the corresponding image element is smaller than the square value of the maximum distance, it is marked accordingly as corresponding to the color reference distribution.

In step S20 it is checked whether the image elements that correspond to the color reference distribution are disposed in locations on the bank note or in the portion which correspond to a local distribution predetermined for the color reference distribution, given in the form of reference positions. In the example it is checked more precisely which of the locations are disposed within a predetermined area. Image elements corresponding to the color reference distribution whose locations do not correspond to the local distribution, and image elements not corresponding to the color reference distribution are then marked as color deviations. In this embodiment the reference positions are given in the form of position coordinates in the portion. A position of an image element corresponds to one of the reference positions if its Euclidian distance is smaller than a predetermined maximum distance in the spatial domain, which can for example be chosen in dependence on the expectable precision of orientation of the color capturing device to the document of value.

In step S22 it is decided on the basis of a predetermined criterion for the image elements not corresponding to the color reference distribution whether the document of value is to be categorized as unsoiled or not. In this example for this purpose the number of image elements marked as a color deviation is compared to a maximum number N predetermined for the type of document of value.

If the number of deviations exceeds the maximum number N, the document of value is regarded as too soiled for further use and the control- and evaluation device 36 activates the switch 20 in such a fashion that the document of value is fed to the shredder 26. Otherwise the control- and evaluation device 36 activates the switch 20 in such a fashion that the document of value is transported to the repository 26.

Figure 6:
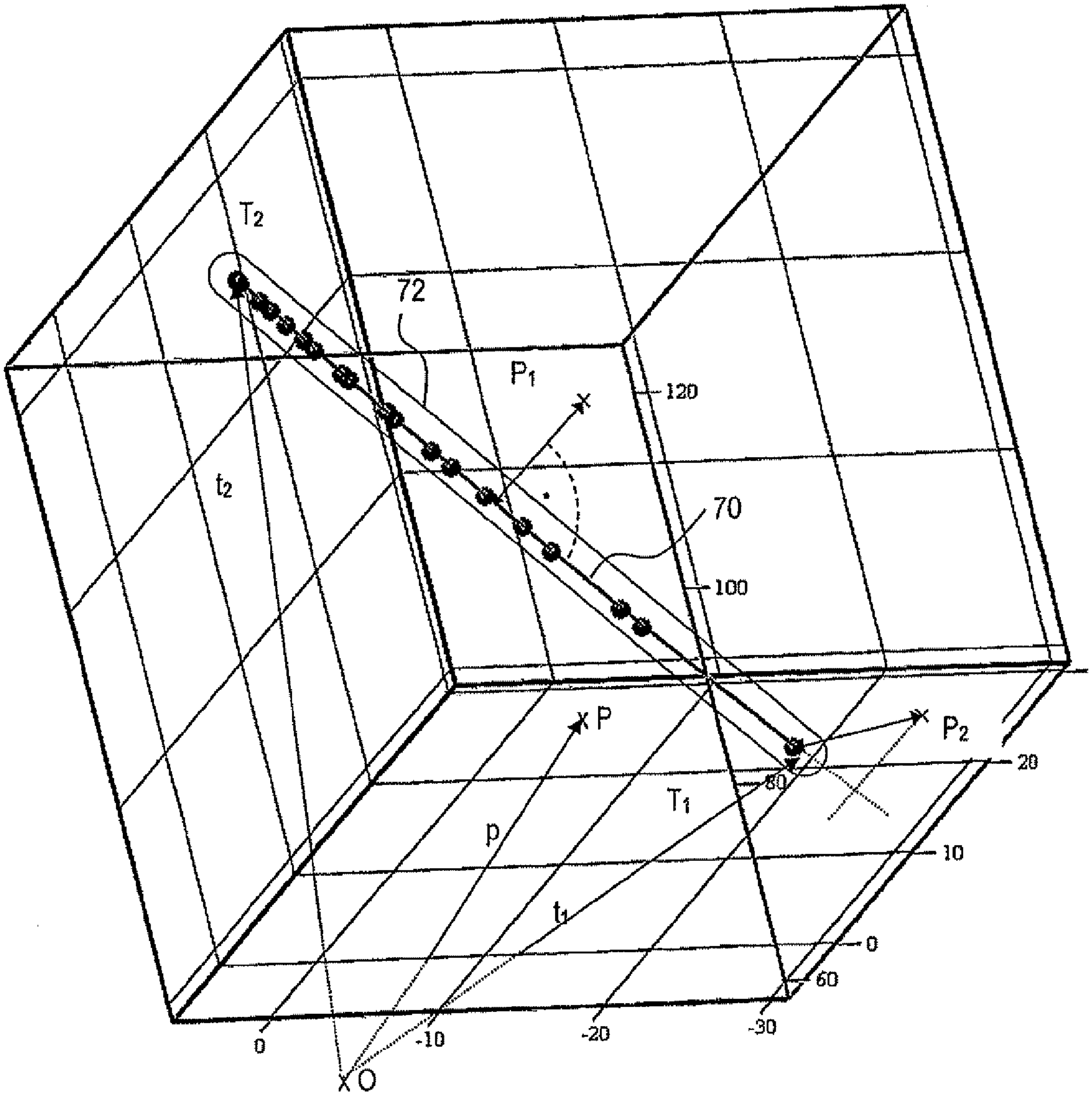
Figure 8:
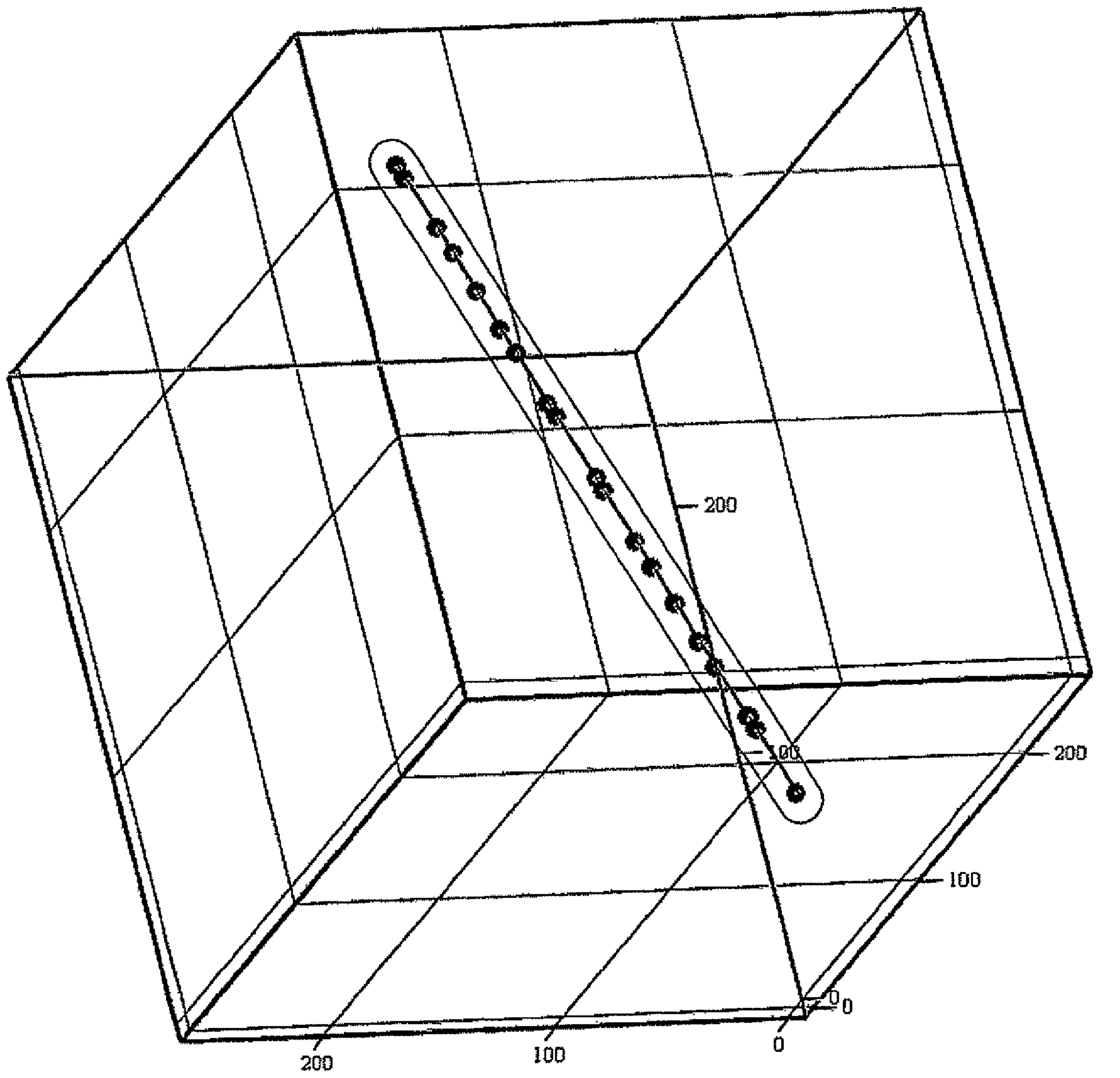

In a second embodiment the RGB color space is chosen as color space instead of the CIE L*a*b color space. In FIG. 8 the distribution of the color space points of the color transition shown in FIG. 6 is represented. As is easily recognizable, also here a very good approximation is given by a section of a straight line or a segment.

In the method only in step S14 a transformation to the RGB color space needs to take place. Furthermore data which describe the color reference distribution have to be changed accordingly.

All other details correspond to those of the first embodiment.

A third preferred embodiment differs from the first embodiment only in that more complicated color transitions can be checked.

Figure 9:
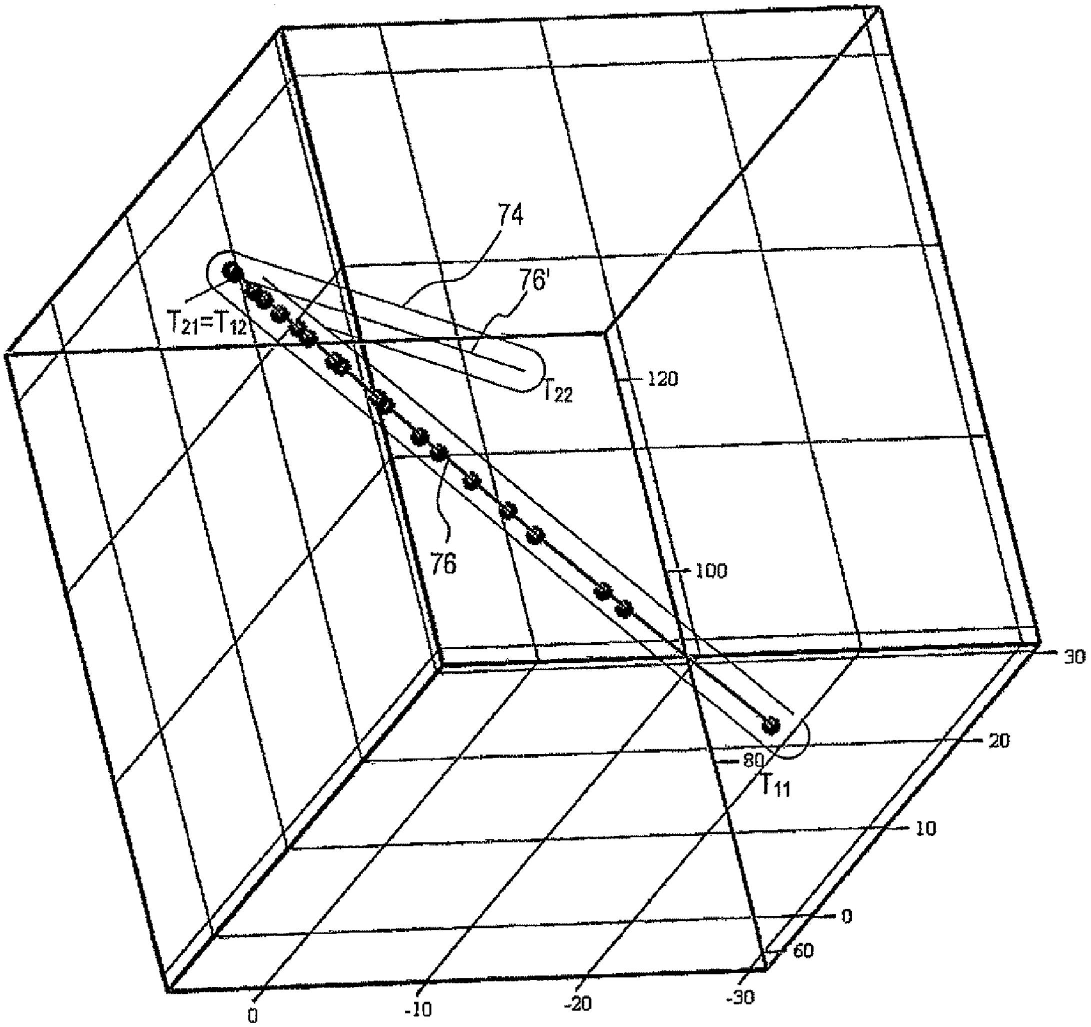

One example for such a complicated color reference distribution for a more complicated color transition, here between three colors, is illustrated in FIG. 9. The color transition corresponds to a color reference distribution which can be represented by a reference surface 74. The reference surface itself can be represented by two segments 76 and 76' and a maximum distance ΔE. The color points of the reference surface are given by all color points whose distance from the two segments, calculated in accordance with the above-described method, is smaller than the maximum distance.

Generally the reference surface can be represented by N segments with end points $T_{i1}$ and $T_{i2}$, represented by vectors $t_{i1}$ and $t_{i2}$ in the used color space, wherein i=1, . . . , N is a natural number. The square value of the distance of a color point from the segments is then given by $$D^2 = \min_{i=1, \dots, N} \{p - t_{1i} - e_{i21}\min(|t_{i2} - t_{i1}|, \max[0, (p - t_{i1})e_{i21}])\}^2$$

with $$e_{i21} = \frac{t_{i2} - t_{i1}}{|t_{i2} - t_{i1}|}$$

This is shown in FIG. 8 for the case N=2, wherein $T_{12}=T_{21}$.

The corresponding method differs from the method of the first embodiment only in that in step S18 now the distance determination mentioned last is carried out.

In different embodiments an image element is not allocated to each pixel, so that the spatial resolution is reduced in the course of the low-pass filtering. The reduction can for example take place in such a fashion that only half as many image elements are generated as there are pixels given.

In other embodiments different color capturing devices are used, as described for example in WO 2006/018283. Furthermore also conventional color sensors with color filters can be used.

Generally the image data can be captured by the relative movement of the color capturing device and the document of value, thus for example also by moving the color capturing device.

In further embodiments it is also possible to capture the image data at a point in time, for which purpose a corresponding color capturing device for capturing a two-dimensional color image is used.

Other embodiments can differ from the above-described embodiments in that the type of document of value, in the example the currency and the denomination of the examined bank note, is determined by capturing geometric dimensions of the bank note and comparing them with predetermined dimensions. Of course also any other method is suitable.

It is also possible that the control- and evaluation device 30 is implemented in such a fashion that it reads data in step S16 which reproduce the type of document of value. This is expedient for example if only documents of value of one predetermined type of document of value are processed.

The determination of the type of document of value can be omitted completely if the apparatus for processing documents of value is configured or used to process documents of value of only one type.

The reference surface or the data defining the same can be determined as follows by means of a correspondingly programmed data processing device which, or whose processor, carries out the calculating steps.

First a number that is as large as possible of documents of value of the same type of document of value in this example bank notes of the same denomination, but with different degrees of soiling and/or color wear is determined. Therein the degree of soiling or color wear preferably varies between "new", that is freshly printed and unsoiled, and strongly soiled and/or worn, i.e. a degree of soiling or color wear which is regarded as only just acceptable, for example by the institute checking the documents of value in circulation, such as a central bank.

Then the steps S10 to S14 for the predetermined documents of value are carried out and the to the predetermined portion of a respective document of value are stored.

Accordingly as processing data for each of the documents of value color space coordinates in the CIE Lab space are given. For the sake of a simpler description of the method the color space coordinates are regarded as coordinates of a three-dimensional vector.

In the next step an average vector determined and stored as an average value of the vectors. The average vector is subtracted from the vectors corresponding to the processing data, so that the resulting shifted vectors have the zero vector as an average value.

In the next step the correlation matrix for the shifted processing data is determined which, corresponding to the dimension of the vectors, is a 3×3 matrix.

In the next step the two largest eigenvalues and eigenvectors of this matrix, which correspond thereto and are orthogonal to each other, are determined.

In the subsequent step the coordinates of the segment specifying the reference surface are determined by first transforming the eigenvector associated with the largest eigenvalue by multiplying with a corresponding scalar factor to a length that is determined by the largest eigenvalue. In the present case the scalar factor is specified in such a fashion that the square value of the length amounts to twice the largest eigenvalue. Afterwards the resulting vector is shifted in such a fashion that the shift carried out before forming the correlation matrix is cancelled out.

The coordinates of the start point and the end point of the resulting vector then are the coordinates of the end points of the searched segment.

The square value of the distance in the direction orthogonal to the segment is given in the form of the second-largest eigenvalue.

The coordinates of the start point and the end point and the value for the predetermined distance are then stored.

A different variant of the method differs from the method explained just above in that instead of the correlation matrix the covariance matrix is used. The eigenvalues are then to be scaled accordingly.

Therein the determination of the eigenvalues and eigenvectors can for example be obtained by means of a singular-value decomposition.

However, in a different embodiment it is possible to use different, iterative methods for determining direction data which determines the eigenvector associated with the largest eigenvalue. For example an algorithm known as NIPALS (nonlinear iterative partial least squares) or variants thereof can be used.

The determination of the length of the segment and of the predetermined distance can then respectively take place in a space which corresponds to the straight line through the segment or a sub-space that is orthogonal to the straight line and has one dimension less than the color space.

A further embodiment differs from the first embodiment in that the color space now comprises a further dimension for the intensity of non-visible optical radiation in a predetermined wavelength range, in the example the infrared range. The color space consequently comprises the usual CIE XYZ dimensions and a further IR dimension. To each image element consequently in addition to the three coordinates for the (visible) colors also an additional coordinate is allocated for the intensity of the IR radiation in the predetermined area.

The described methods are now carried out in the four-dimensional space. Therein the described transformations of the sub-space for the (visible) colors can also be carried out corresponding to the transformations of the color space in the first embodiment, wherein the additional dimension or the corresponding additional coordinate can remain invariant.

In this way also a wear of IR printing inks can be detected.

The invention claimed is:

1. A method for detecting soiling and/or color wear in the area of color transitions in at least one portion of a document of value of a predetermined type of document of value on the basis of processing data reproducing color coordinate values of image elements in a color space in dependence on the position of the areas in the portion of the document of value that correspond respectively to the image elements, and of reference data reproducing for a type of documents of value a predetermined color reference distribution of color coordinate values in the color space in dependence on reference positions on a document of value of the type of document of value, comprising the steps:

determining for each of the image elements whether the color coordinate values in the color space that are allocated to the image element correspond to the color reference distribution, wherein the color reference distribution is given by at least one predetermined, closed reference surface, wherein the closed reference surface is defined by at least one linear segment predetermined for the type of document of value and a predetermined distance of predetermined points from the at least one linear segment;

comparing the positions of the image elements whose color coordinate values were determined as corresponding to the reference distribution to predetermined reference positions on the document of value; and detecting, in dependence on the result of the comparison, a presence or an absence of soiling and/or color wear in the area of a color transition.

2. The method according to claim 1, wherein, for checking whether color coordinate values for an image element correspond to the color reference distribution, a check is made of whether a point corresponding to the color coordinate values is disposed inside or outside of the reference surface.

3. The method according to claim 1, wherein for checking whether the color coordinate values allocated to the respective image element-correspond to the color reference distribution, a value is determined which reproduces the distance of the point corresponding to the color coordinate values from the at least one segment.

4. The method according to claim 1, wherein the color space used is a device-independently defined color space.

5. The method according to claim 1, wherein the distance is given in dependence on a minimum distance of two color coordinate values in the color space for colors which are recognized as different by a predetermined viewer under predetermined viewing conditions.

6. The method according to claim 1, wherein the distance is predetermined in dependence on the type of document of value.

7. The method according to claim 1, wherein for generating the processing data, image data of pixels of a captured image of the portion are used from which the color coordinate values and the positions can be determined, and wherein the processing data for an image element are determined using a low-pass filtering of the image data.

8. The method according to claim 1, wherein for generating the processing data, image data of pixels of a captured image of the portion are used from which the color coordinate values and the positions are determined, and wherein the processing data for an image element are determined using the image data of at least two pixels.

9. The method according to claim 1, wherein the color space has, in addition to dimensions for the visible colors, a further dimension for non-visible optical radiation in a predetermined wavelength range, the image elements comprise data relating to the non-visible optical radiation in the predetermined wavelength range, and the reference surface is given by at least one linear segment predetermined for the type of document of value and a predetermined distance of the points of the reference surface from the at least one linear segment.

10. An apparatus for detecting soiling and/or color wear in the area of color transitions in at least one portion of a document of value of a predetermined type of document of value, comprising:

at least one programmed processor such that a computer is programmed with software modules that captures processing data reproducing color coordinate values of image elements in a color space in dependence on the position of the areas in the portion of the document of value that correspond respectively to the image elements, and an evaluation device configured to carry out the method according to claim 1 on the basis of processing data captured via the at least one programmed processor and of reference data reproducing for a type of document of value a predetermined color reference distribution of color coordinate values in the color space in dependence on reference positions on a document of value of the type of document of value, and to determine for each of the image elements whether the color coordinate values in the color space that are allocated to the image element correspond to the color reference distribution, wherein the color reference distribution is given by a predetermined closed reference surface in the color space, wherein the closed reference surface is defined by at least one linear segment predetermined for the type of document of value and a predetermined distance of predetermined points from the at least one linear segment, to compare the positions of the image elements whose color coordinate values were determined as corresponding to the reference distribution with predetermined reference positions on the document of value, and to detect, in dependence on the result of the comparison, a presence or an absence of soiling and/or color wear in the area of a color transition.

11. A computer program stored on a non-transitory computer readable medium for detecting soiling and/or color wear in the area of color transitions in at least one portion of a document of value of a predetermined type of document of value, having instructions for at least one processor, upon whose execution the processor carries out a method wherein, on the basis of processing data reproducing color coordinate values of image elements in a color space in dependence on the position of the areas in the portion of the document of value that correspond respectively to the image elements, and of reference data reproducing for a type of document of value, a predetermined color reference distribution of color coordinate values in the color space in dependence on reference positions on a document of value of the type of document of value is determined, for each of the image elements, a determination is made whether the color coordinate values in the color space that are allocated to the image element correspond to the color reference distribution, wherein the color reference distribution is given by a predetermined closed reference surface, wherein the closed reference surface is defined by at least one linear segment predetermined for the type of document of value and a predetermined distance of predetermined points from the at least one linear segment, the positions of the image elements whose color coordinate values were determined as corresponding to the reference distribution with predetermined reference positions on the document of value are compared, and in dependence on the result of the comparison, a presence or an absence of soiling and/or color wear in the area of a color transition is detected.

12. The computer program according to claim 11, wherein the instructions are given in such a fashion that, upon their execution, for checking whether color coordinate values for an image element correspond to the color reference distribution, the processor checks whether a point corresponding to the color coordinate values is disposed inside or outside of the reference surface.

13. The computer program according to claim 11, wherein the instructions are given in such a fashion that, upon their execution, for checking whether the color coordinate values allocated to the respective image element correspond to the color reference distribution, the processor determines a value reproducing the distance of the point corresponding to the color coordinate values from the at least one segment.

14. The computer program according to claim 11, wherein the instructions are given in such a fashion that, upon their execution, the processor uses a device-independently defined color space as the color space.

15. The computer program according to claim 11, wherein the instructions are given in such a fashion that, upon their execution by the processor, the distance is given in dependence on a minimum distance of two color coordinate values in the color space for colors which can still be recognized as different by a predetermined viewer under predetermined viewing conditions.

16. The computer program according to claim 11, wherein the instructions are given in such a fashion that, upon their execution by the processor, the distance is predetermined in dependence on the type of document of value.

17. The computer program according to claim 11, wherein the instructions are given in such a fashion that, upon their execution, for generating the processing data, the processor uses image data of pixels of a captured image of the portion, from which the color coordinate values and the positions can be determined, and determines the processing data for an image element using a low-pass filtering of the image data.

18. The computer program according to claim 11, wherein the instructions are given in such a fashion that, upon their execution, for generating the processing data, the processor uses image data of pixels of a captured image of the portion, from which the color coordinate values and the positions can be determined, and generates the processing data for an image element using the image data of at least two pixels.

19. The computer program according to claim 11, wherein the instructions are given in such a fashion that the color space has, in addition to dimensions for the visible colors, a further dimension for non-visible optical radiation in a predetermined wavelength range, the image elements comprise data relating to the non-visible optical radiation in the predetermined wavelength range, and the reference surface is given by at least one linear segment predetermined for the type of document of value and a predetermined distance of the points of the reference surface from the at least one linear segment.

20. A method for determining the closed reference surface used in the method according to claim 1, comprising:

determining for a predetermined number of documents of value of a predetermined type of document of value, respectively allocated processing data which reproduce color coordinate values of image elements in a color space in dependence on the position of the areas in the portion of the document of value that correspond respectively to the image elements;

determining first components reproducing average values over the color coordinates, and components reproducing correlations between the color coordinates, of a matrix in the color space or a different color space from the processing data;

determining direction data which specify the eigenvectors associated with the two largest eigenvalues of the matrix;

determining data defining the linear segment from the direction data in such a fashion that the middle of the segment is specified by the average values, and the direction of the segment is specified by the direction of the first eigenvector, and determining the length of the segment and the predetermined distance from the segment in dependence on the largest eigenvalue or second-largest eigenvalue, or a parameter reproducing the correlation along the segment and the largest correlation in a sub-space orthogonal to the segment.

21. The method according to claim 20, wherein the components of the matrix that are determined are the components of the correlation matrix.

22. The method according to claim 20, wherein the components of the matrix that are determined are the components of the covariance matrix.

23. The method according to claim 20, wherein the processing data used for determining the components reproducing the average values, and components reproducing correlations between color coordinates, are color coordinates in a Lab color space.

24. The method according to claim 20, wherein the color space has, in addition to dimensions for the visible colors, a further dimension for non-visible optical radiation in a predetermined wavelength range, the image elements comprise data relating to the non-visible optical radiation in the predetermined wavelength range, and the reference surface is given by at least one linear segment predetermined for the type of document of value and a predetermined distance of the points of the reference surface from the at least one linear segment.

* * * * *